No. 779,865. PATENTED JAN. 10, 1905.
P. McGRATH.
SIPHON.
APPLICATION FILED AUG. 25, 1904.
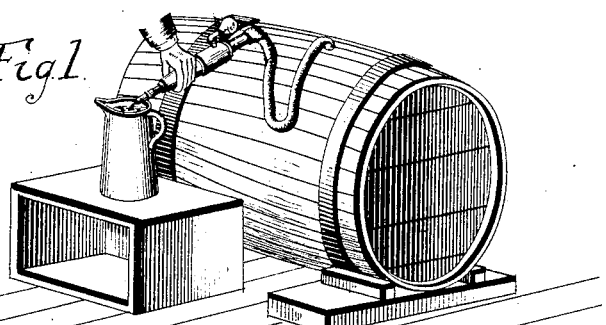
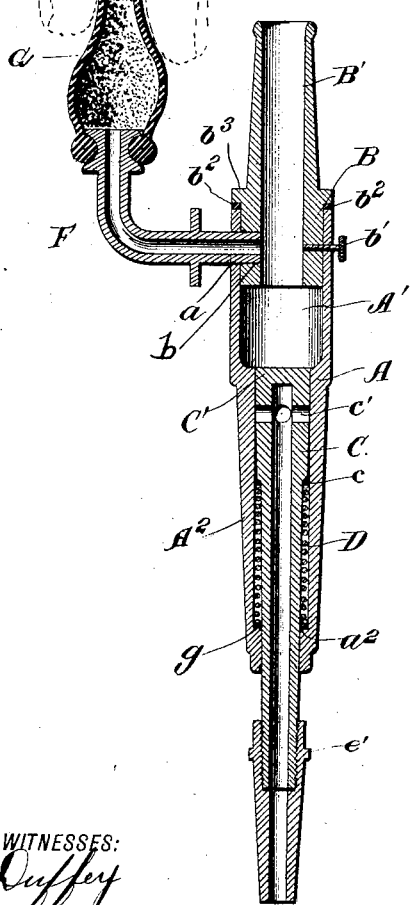
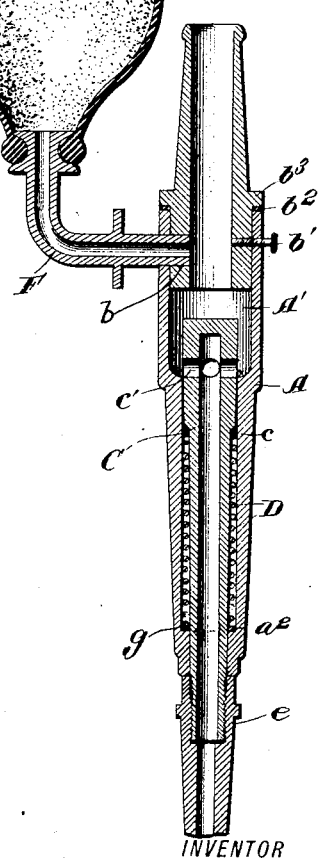
WITNESSES:
C. C. Duffey
Geo. S. Brock
INVENTOR
Peter McGrath
BY Munn & Co.
ATTORNEYS No. 779,865. Patented January 10, 1905.

UNITED STATES PATENT OFFICE.

PETER McGRATH, OF HIBBING, MINNESOTA.

SIPHON.

SPECIFICATION forming part of Letters Patent No. 779,865, dated January 10, 1905.

Application filed August 25, 1904. Serial No. 222,043.

*To all whom it may concern:*

Be it known that I, PETER McGRATH, a citizen of the United States, residing at Hibbing, in the county of St. Louis and State of Minnesota, have invented a new and useful Improvement in Siphons, of which the following is a specification.

My invention relates to an improvement in siphons, and has for its object to provide a simple, cheap, and efficient device for withdrawing liquids from vessels having no faucets or other outlets.

My invention consists in certain novel features of construction, operation, and combination of parts, as will be hereinafter fully described, and pointed out in the claims, reference being had to the accompanying drawings, in which—

Figure 1 is a perspective view showing my improvement as in use. Fig. 2 is a longitudinal section showing the device preparatory to starting flow of liquid. Fig. 3 is a similar view showing the position of parts while the siphon is in action.

In the drawings, A represents the barrel or main body portion of the device. Said barrel or body portion consists of the chambers A' and A², the upper chamber A' being larger than the lower one. Near the upper end of the upper chamber an opening $a$ is drilled through one of its side walls, and fitted into the top of chamber A' is the tube B, provided with the nipple B' for attaching to a piece of hose or tubing, which is to be placed in the vessel from which the liquid is drawn. The tube B' is also provided with an opening $b$, drilled through one of its side walls, and when the tube is in its proper position within the upper chamber A' the openings $a$ and $b$ will register. The parts A and B are held together by a set-screw $b'$, as shown in Figs. 2 and 3, and a gasket $b^2$ is placed around the tube B and rests upon the top edge of A, being prevented from movement by the flange $b^3$.

The lower chamber A², as stated, is of less internal diameter than the upper chamber, the lower end of said chamber A² having the internal shoulder $a^2$, upon which is seated a gasket $g$. A hollow plunger or piston-valve C, having an enlarged head C', which is closed at the top, is placed within the body of the device and has a washer $c$ surrounding the hollow plunger-head, said washer fitting the reduced lower chamber A² water-tight, yet permitting the enlarged head to have a reciprocating movement, like a piston, within said lower chamber. A coiled spring D surrounds the hollow plunger and bears at its upper end against the enlarged head C' and rests at its lower end upon the gasket $g$ in the lower end of said reduced chamber. The enlarged head C' is provided with a number of transverse openings which communicate with the central passage through the plunger C. The coiled spring D normally forces the plunger upwardly, so that the transverse openings in the enlarged head will open into the upper chamber A'. To the lower end of the hollow plunger is screwed the nozzle $e$, having the annular circumferential flange or head $e'$.

F represents an elbow or gooseneck, one end of which is secured in the registering openings of the upper chamber A' and the tube B, and on the other end of said elbow is fitted a compressible bulb G, as shown in Figs. 2 and 3.

To use my device, the parts being arranged as shown in Fig. 2, the plunger having been pulled down against the action of the spring, no liquid can pass through the hollow plunger, as the transverse openings of the plunger are below the lower end of chamber A' and the head of said plunger fitting water-tight within the lower chamber A². The bulb is now compressed, forcing air out of the tube B and the nozzle or hose into the barrel. The bulb is then released and allowed to expand again, and by so doing draws the liquid from the barrel into the chamber A' of the siphon and fills the same. The lower end of nozzle $e$ is now released, whereupon the spring D forces the hollow plunger upwardly and exposes the transverse openings in its head. When this takes place, the liquid in the siphon immediately enters these transverse openings and flows out of the nozzle $e$ into the vessel which it is desired to fill. The flow will now continue as long as desired or until the hollow plunger is again pulled down to close the transverse openings. When this has been done, by simply inverting the siphon the liquid remaining in the chamber A' and the hose or tubing may be run back into the barrel. It is understood, of course, that to secure the continuous flow of the liquid from the barrel the siphon is to be held below the level of the liquid in the barrel. The liquid in passing from the hose to chamber A' will be prevented from entering the bulb by reason of the shape of the elbow or gooseneck.

The parts are provided with threaded connections by means of which the device can be readily taken apart for cleaning and packing.

Having thus described my invention, what I claim as new, and desire to secure by Letters Patent, is—

1. A siphon consisting of a barrel or main body portion having open upper and lower ends and comprising an upper and a lower chamber, the upper chamber being of greater internal diameter than the lower chamber, a hollow plunger adapted to reciprocate within said body portion and having a closed head an open lower end and transverse openings near its upper end, said head having a liquid-tight fit in the reduced lower chamber, a spring located between the head of the plunger and the lower end of the lower chamber normally forcing the head of the plunger into the upper chamber and exposing its transverse openings therein, and a compressible bulb operatively connected with upper chamber of the body portion.

2. A siphon consisting of a barrel or main body portion having open upper and lower ends, and comprising an enlarged upper chamber and a reduced lower chamber, a hollow plunger having an enlarged head closed at its upper end, said head having a liquid-tight fit in the reduced lower chamber and provided with transverse openings in its head communicating with the internal bore of the plunger, a nozzle extending from the lower end of the hollow plunger below the lower chamber and having an enlarged outer portion to act as a limiting-stop to the upward movement of said hollow plunger, a spring located between the head of the plunger and the lower end of the lower chamber, said spring adapted to normally force the head of the plunger into the enlarged upper chamber and uncover the transverse openings in the plunger, and a compressible bulb communicating with the upper chamber.

3. In a siphon the combination with a barrel or main body portion consisting of an upper and lower chamber the upper chamber being of greater internal diameter than the lower chamber, said upper chamber provided near its upper end with an opening through its side wall, an open-end tube having an opening through its side wall and fitted in the upper end of the upper chamber, the openings in the side walls of the upper chamber and the open-ended tube registering, an elbow or gooseneck fitted at one end in said registering openings, a tube or hose fitted to the upper end of the open-ended tube and adapted to be inserted in a barrel or other liquid-receptacle, a hollow plunger mounted in the barrel of the siphon, the upper end of said plunger being enlarged and closed and provided with transverse openings communicating with the interior bore of the plunger, the head of said plunger adapted to fit liquid-tight in the lower reduced chamber, a coiled spring surrounding said plunger and bearing at its upper end against the enlarged head thereof and at its lower end against the lower end of the reduced lower chamber, a nozzle secured to the lower end of the plunger and having a stop outside of the lower chamber to limit the upward movement of the plunger, and means for exhausting the air from upper chamber of the barrel.

PETER McGRATH.

Witnesses:
ULYSSES G. STEVENSON,
H. M. VALLETTE.